US012681556B2

(12) United States Patent
Muthiah et al.

(10) Patent No.: US 12,681,556 B2
(45) Date of Patent: Jul. 14, 2026

(54) SELECTABLE LOW POWER MODE FOR STORAGE DEVICES

(71) Applicant: Western Digital Technologies, Inc., San Jose, CA (US)

(72) Inventors: Ramanathan Muthiah, Bangalore (IN); Taninder Singh Sijher, Bangalore (IN); Anil Kumar Toranagallu, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 123 days.

(21) Appl. No.: 18/491,540

(22) Filed: Oct. 20, 2023

(65) Prior Publication Data

US 2025/0130624 A1 Apr. 24, 2025

(51) Int. Cl.
*G06F 1/26* (2006.01)
*G06F 1/32* (2019.01)
*G06F 1/3296* (2019.01)

(52) U.S. Cl.
CPC .................................. *G06F 1/3296* (2013.01)

(58) Field of Classification Search
CPC ...................................................... G06F 1/3296
See application file for complete search history.

(56) References Cited

U.S. PATENT DOCUMENTS 10,379,595 B2 * 8/2019 Stenfort ................ G06F 3/0688
11,966,272 B2 * 4/2024 Liang ........................ G06F 1/28

| | | | |
|---|---|---|---|
| 2002/0037714 A1 * | 3/2002 | Takae ...................... | H04W 8/20 455/420 |
| 2005/0278558 A1 * | 12/2005 | Chen .......................... | G06F 1/32 713/300 |
| 2008/0077726 A1 * | 3/2008 | Gilbert ..................... | G06F 1/26 710/316 |
| 2008/0104343 A1 * | 5/2008 | Miyagaki .............. | G06F 3/0613 711/158 |
| 2011/0098068 A1 * | 4/2011 | Wakabayashi ......... | H04B 3/544 455/507 |
| 2014/0075229 A1 | 3/2014 | Krishnamoorthy et al. | |
| 2014/0215244 A1 | 7/2014 | Hong | |
| 2017/0115723 A1 * | 4/2017 | Shurin .................. | G06F 1/3287 |
| 2017/0371574 A1 * | 12/2017 | Springberg ......... | G06F 13/4068 |
| 2020/0125155 A1 * | 4/2020 | Mcdaniel .................. | G06F 1/30 |

(Continued)

OTHER PUBLICATIONS

Co-pending U.S. Appl. No. 18/448,887, filed on Aug. 11, 2023, and all art cited therein now and in the future.

*Primary Examiner* — Mohammed H Rehman

(74) *Attorney, Agent, or Firm* — Chang & Hale LLP

(57) ABSTRACT

An external data storage device, without a battery, provides a user-selectable low power mode. The external data storage device includes storage media for storing data and a data port for receiving power and transmitting data to a host device. The external storage data device includes control circuitry configured to negotiate delivery of a first amount of power from the host device in response to connecting the external data storage device to the host device, receive the first amount of power from the host device, receive a selection, via an input device, of a reduced power mode from a user, and reduce power consumption from the host device to a second amount of power lower than the first amount of power in response to receiving the selection of the reduced power mode.

20 Claims, 6 Drawing Sheets

(56)  References Cited

U.S. PATENT DOCUMENTS

| | | | |
|---|---|---|---|
| 2021/0294408 A1 | 9/2021 | Hodes et al. | |
| 2022/0417249 A1 | 12/2022 | Klapman | |
| 2023/0035137 A1 | 2/2023 | D | |
| 2023/0118815 A1 | 4/2023 | Cheong | |
| 2023/0259484 A1* | 8/2023 | Chung | G06F 13/20 |
| | | | 710/313 |
| 2023/0350585 A1* | 11/2023 | Zhao | G06F 3/0611 |
| 2024/0281049 A1* | 8/2024 | Aung | G06F 1/263 |

* cited by examiner

WIRELESS DATA
CONNECTION
208

POWER/DATA
CONNECTION
204

202

206

300 — STORAGE DEVICE POWER MODE SELECTION

302 — ☑   1) Low Power Mode

304 — ☐   2) Standard Power Mode

310 — STORAGE DEVICE POWER MODE CONFIGURATION

ASSIGNED FINGERPRINT

1) Low Power Mode     312

2) Standard Power Mode     314

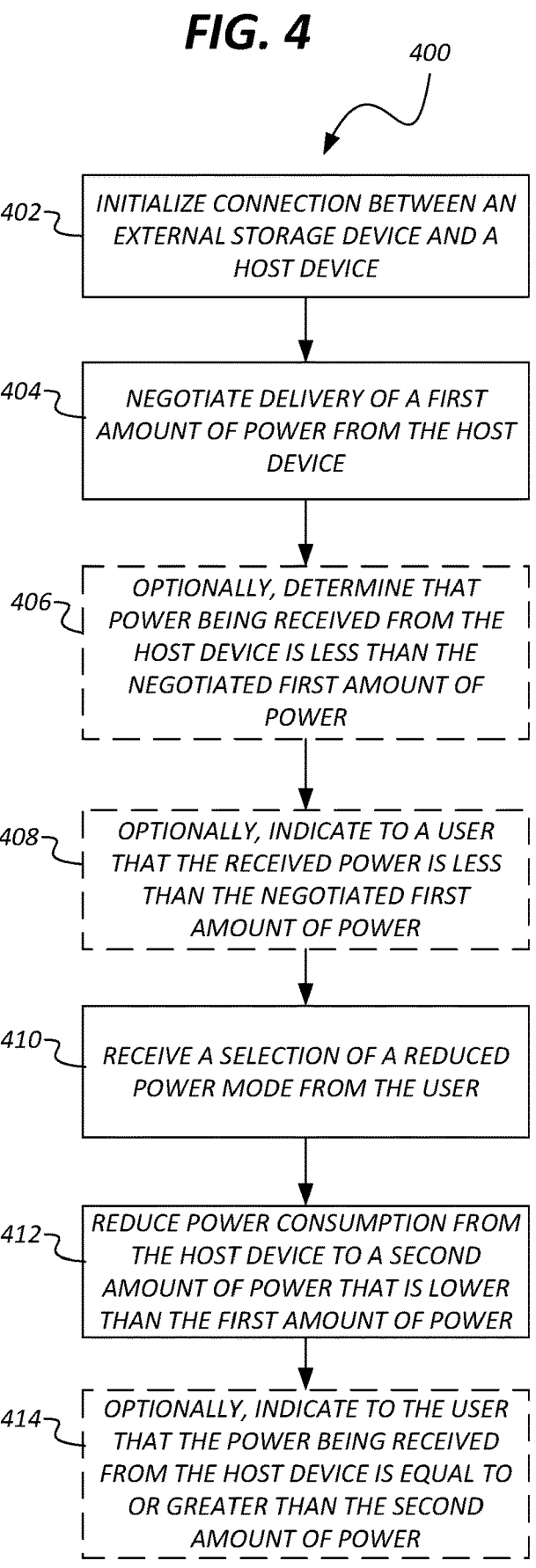

402 — INITIALIZE CONNECTION BETWEEN AN EXTERNAL STORAGE DEVICE AND A HOST DEVICE

404 — NEGOTIATE DELIVERY OF A FIRST AMOUNT OF POWER FROM THE HOST DEVICE

406 — OPTIONALLY, DETERMINE THAT POWER BEING RECEIVED FROM THE HOST DEVICE IS LESS THAN THE NEGOTIATED FIRST AMOUNT OF POWER

408 — OPTIONALLY, INDICATE TO A USER THAT THE RECEIVED POWER IS LESS THAN THE NEGOTIATED FIRST AMOUNT OF POWER

410 — RECEIVE A SELECTION OF A REDUCED POWER MODE FROM THE USER

412 — REDUCE POWER CONSUMPTION FROM THE HOST DEVICE TO A SECOND AMOUNT OF POWER THAT IS LOWER THAN THE FIRST AMOUNT OF POWER

414 — OPTIONALLY, INDICATE TO THE USER THAT THE POWER BEING RECEIVED FROM THE HOST DEVICE IS EQUAL TO OR GREATER THAN THE SECOND AMOUNT OF POWER

*500*

502 — RECEIVE A FIRST INPUT SELECTING A REDUCED POWER MODE FROM A USER

504 — TRANSMIT THE SELECTION OF THE REDUCED POWER MODE TO THE STORAGE DEVICE

506 — RECEIVE A SECOND INPUT SELECTING A STANDARD POWER MODE FROM A USER

508 — TRANSMIT THE SELECTION OF THE STANDARD POWER MODE TO THE STORAGE DEVICE

FIG. 6

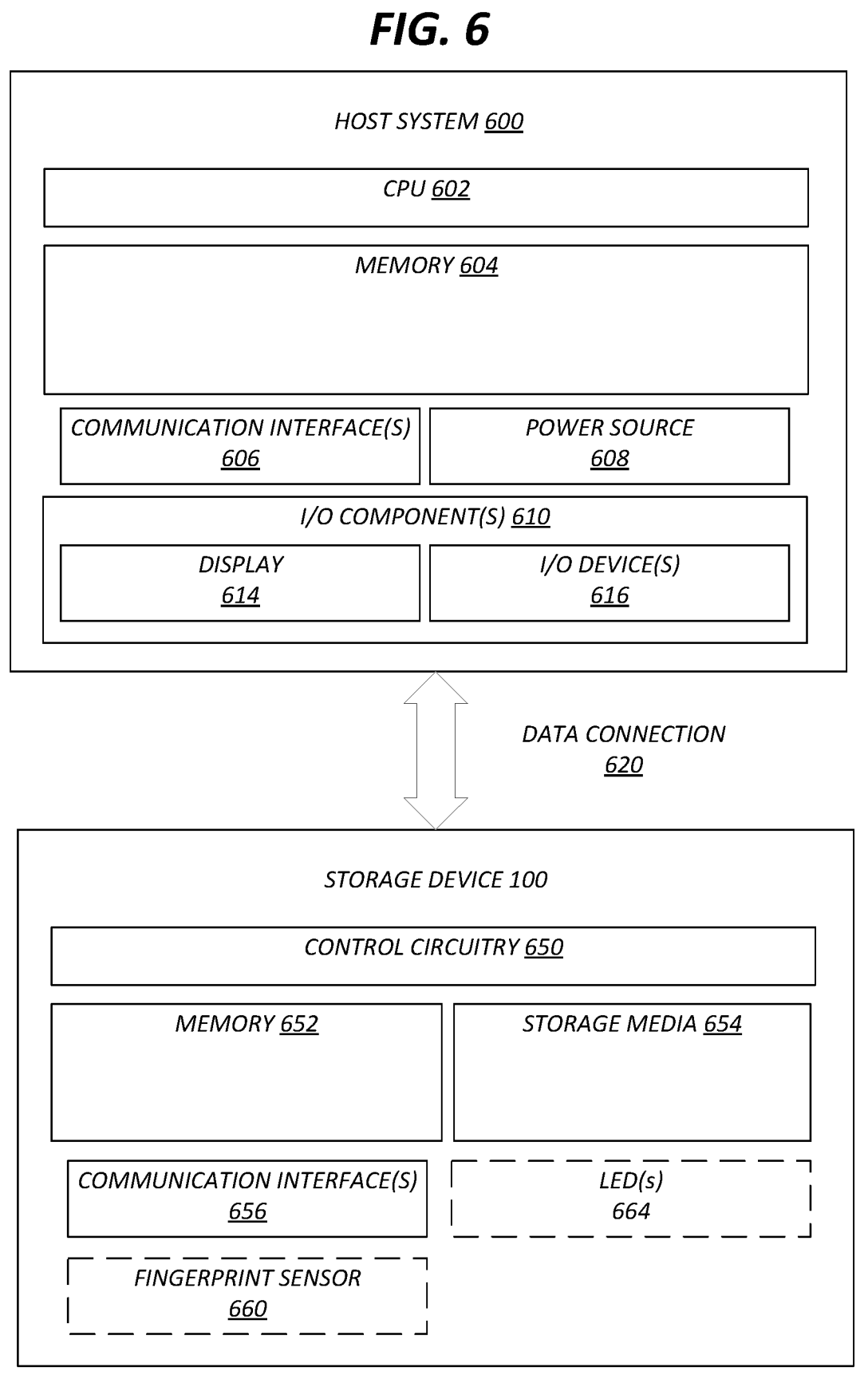

HOST SYSTEM 600

CPU 602

MEMORY 604

COMMUNICATION INTERFACE(S) 606

POWER SOURCE 608

I/O COMPONENT(S) 610

DISPLAY 614

I/O DEVICE(S) 616

DATA CONNECTION 620

STORAGE DEVICE 100

CONTROL CIRCUITRY 650

MEMORY 652

STORAGE MEDIA 654

COMMUNICATION INTERFACE(S) 656

LED(s) 664

FINGERPRINT SENSOR 660

SELECTABLE LOW POWER MODE FOR STORAGE DEVICES

BACKGROUND

Field

This disclosure relates to improving the performance reliability of storage devices. More particularly, the disclosure relates to devices and methods for selectively reducing the power usage of a storage device.

Description of Related Art

An external data storage device, often referred to simply as an external drive or external hard drive, is a portable storage device that connects to a computer or other digital devices externally to provide additional storage capacity. These devices are commonly used to expand the storage capabilities of computers, back up important data, and transfer files between different devices. Typically, external data storage devices do not have their own power source (e.g., are battery-less) but obtain power from a connected host device.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to additional embodiments, which are part of this disclosure.

FIG. 2 illustrates a diagram of a separate input device for the external data storage device 100, according to certain embodiments.

FIG. 4 illustrates a block diagram representing a power reduction process performed by an external data storage device, according to certain embodiments.

FIG. 6 illustrates a block diagram providing example details of the external data storage device and a host system, according to certain embodiments.

DETAILED DESCRIPTION

Figures 1A, 1B, 1C:
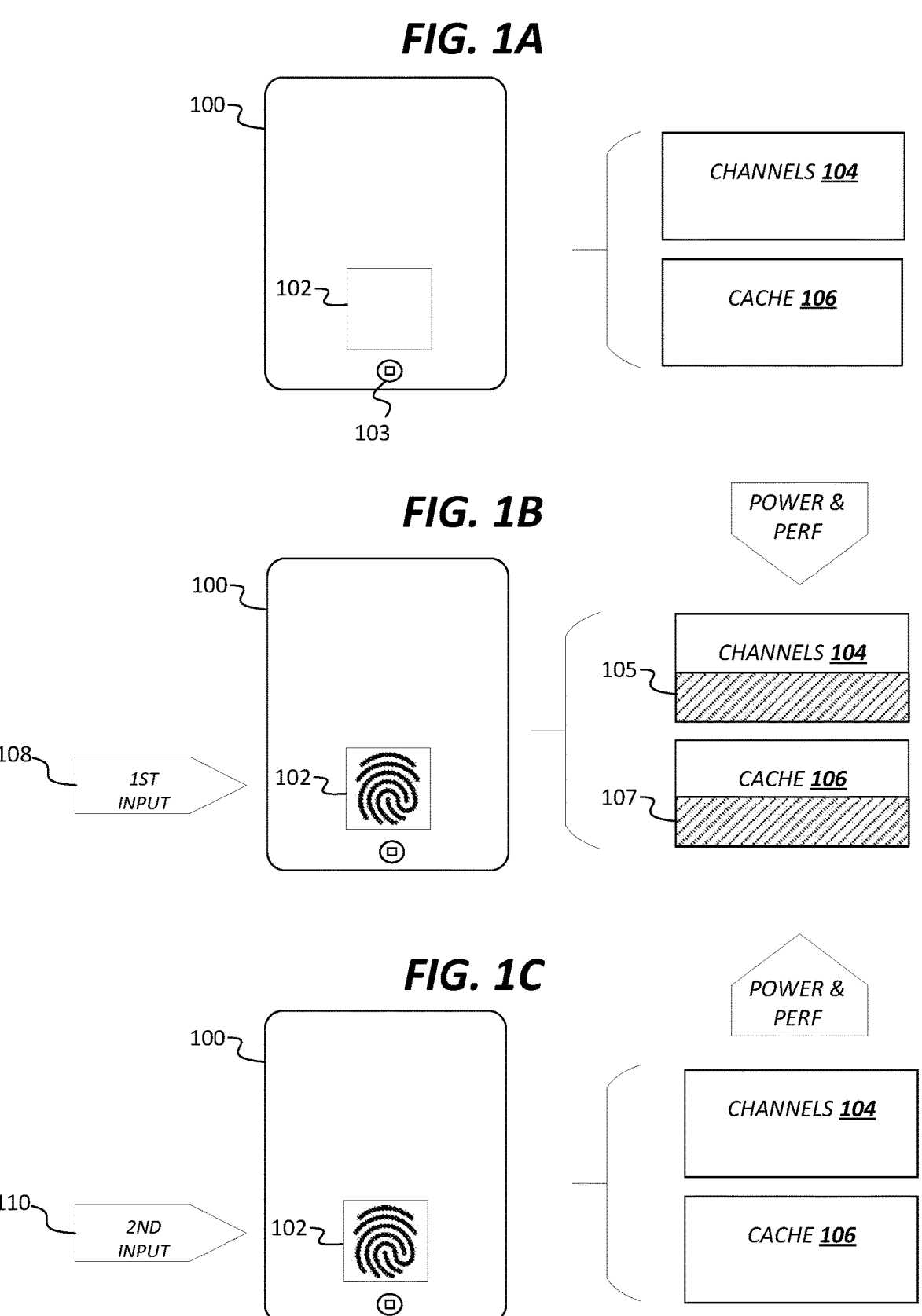
FIGS. 1A-1C are diagrams illustrating various configurations of an external data storage device that includes a selectable reduced power mode, according to certain embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

External data storage devices are designed to be portable and can be moved around and connected to multiple computers. A typical use case involves transferring data from one computer to another. Other use cases include providing storage for backup data from a computer, archiving old data, and/or providing media storage. Typically, external data storage devices include a housing or casing containing the data storage medium, such as a solid state drive (SSD), hard disk drive, solid state hybrid drive (SSHD), or flash memory. The data storage medium is connected via a data interface, such as universal seral bus (USB) board having a controller and a data port. The port can be used to provide both a data connection and a power connection. External data storage devices typically do not have their own power source (e.g., a battery) and instead receive power from a host device via a data/power cable physical connected to their data port or via a direct port-to-port connection with the host device.

Many host devices that are connected to external data storage devices are powered by a battery. For example the host device may be a laptop, tablet, or mobile device. If the host device is not connected to a wall outlet, the battery may eventually run low. At that point, the host device may not be able to provide a negotiated power to the external data storage device. For example, the host device may go into a power saving mode that consequently reduces the power provided via USB.

If the external data storage device does not have sufficient power, several problems can arise that affect its functionality and data integrity. One common issue is that the drive may not be recognized by the host device or otherwise disconnects from the host device, rendering it inaccessible. Additionally, insufficient power can lead to data corruption or errors on the drive, potentially resulting in data loss or damage. Even if the drive remains operational, it may suffer from slow performance, causing file transfers and data access to become sluggish. In some cases, the drive may intermittently disconnect and reconnect due to power issues, leading to further disruptions. Over time, ongoing power problems may even cause physical damage to the external data storage device's components, rendering it permanently unusable and potentially causing permanent data loss.

One solution for this problem is to enable the user to select the a reduced power mode (also called a low power mode) for the external data storage device. In the reduced power mode, the external data storage device reduces its power below an initially negotiated amount from the host device. This reduced power mode may involve using less of the hardware resources of the external data storage device, such as processing resources (e.g., operating at a lower clock frequency), data channels, and/or cache. Power use can also be lowered by reducing activity on the external data storage device, such as by delaying garbage collection or using less die interleaving, which distributes data and read/write operations across multiple NAND flash memory dies simultaneously.

In the reduced power mode, the external data storage device can operate without generating disconnects or other disruptions readily apparent to the user. The external data storage device may operate with lower performance, but lower performance is typically harder for the user to notice and is less disruptive to the user experience.

The reduced power mode may be performed proactively, at the direction of the user. By enabling the user to start the reduced power mode, the user can trigger the mode in anticipation of a low battery situation of the host device. For example, if the user is away from an outlet, the user can anticipate that power will be limited in the future and can put the external data storage device in the reduced mode ahead of time to preserve power for later.

In addition, by enabling the user to trigger the reduced power mode, the host device itself does not have to be aware of the reduced power mode of the external data storage device. For example, the host device does not need additional software (e.g., special drivers) installed to support the reduced power mode. This enables greater compatibility as the host device can use standard drivers for the external data storage device and does not need to install special drivers that support the reduced power mode.

The following describes devices and methods that enable the a user to select a reduced power mode for an external data storage device. The user may input the selection through a variety of means. For example, the external data storage device may include an input device on its casing to enable selection of the reduced power mode. In one embodiment the input device is a fingerprint sensor and detects a fingerprint of the user associated with the reduced power mode. The input device could also be a button on the casing. In another embodiment, the input device is a third device, such as a mobile computing device different from the host device and the external data storage device, that communicates wirelessly with the external data storage device. The mobile device may include an application (also called an app) for controlling the external data storage device and causing the external data storage device to enter the reduced power mode.

Selectable Reduced Power Mode

FIGS. 1A-1C are diagrams illustrating various configurations of an external data storage device 100 that includes a selectable reduced power mode, according to certain embodiments. In some embodiments, the external data storage device 100 includes a fingerprint sensor 102 (also called a fingerprint scanner) for detecting fingerprints as an input device. The fingerprint sensor 102 may be formed on an external surface of an enclosure of the external data storage device 100. For example, the external data storage device 100 may be an external storage drive, with a display-less enclosure, with a data port (e.g., USB) and the fingerprint sensor 102 formed on outside of the enclosure. Other embodiments may utilize other forms of input devices, such as a button 103 or app-based control from a separate computing device.

Fingerprint scanners are biometric devices that capture and analyze the unique patterns on an individual's fingerprint to authenticate their identity. The scanner 102 can capture an image of the fingerprint using different techniques such as optical, capacitive, or ultrasonic methods. This image can then be processed to enhance its quality, correct distortions, and extract key features. Features like ridge endings, bifurcations, orientations, and minutiae can be extracted to create a mathematical representation called a fingerprint template.

The fingerprint template contains the unique characteristics of the fingerprint and serves as a reference for comparison. The template is stored securely, in the external data storage device 100. This enables matching without storing the actual fingerprint image for privacy and security reasons. When a user attempts to authenticate, their fingerprint is scanned again, and a new template is created. This new template is then compared to the stored templates using matching algorithms.

During the matching process, the external data storage device 100 can compare the newly created template with the stored templates to find a match. Various factors, such as the level of similarity or dissimilarity, are considered to determine if the authentication is successful. If the match falls within a predefined threshold, the authentication is considered successful. However, if there is no significant match, the authentication is rejected, and access is denied. While the above has described using templates, matching fingerprints may also be accomplished by storing actual fingerprints or parts of fingerprints, or using other data derived from fingerprints.

In addition, the external data storage device 100 has at least two storage modes. Different fingerprints of a user can be associated with different storage modes, such that the user can quickly and easily set the storage mode of the external data storage device 100 using a particular fingerprint.

In addition, the fingerprint scanner 102 may also be used to authenticate the user and provide access to the external data storage device 100. For example, access to the contents may be locked until authentication is received. In some implementations, the storage device 100 may be encrypted and authenticating with a fingerprint causes the external data storage device 100 to decrypt its contents.

A button or similar input device may be used in addition to or alternatively to the fingerprint sensor 102. The button or other input device may be formed on an external surface of the enclosure of the external data storage device 100. Pressing the button can cause the external data storage device 100 to enter the reduced power mode.

As shown in FIG. 1A, the external data storage device can include memory channels 104 and cache 106. Some storage devices, such as SSDs, are composed of NAND flash memory chips, and these memory chips are organized into channels. Each memory channel is essentially a separate data pathway that enables simultaneous data access and transfer. By having multiple memory channels, an SSD can parallelize data operations, which means it can read from or write to multiple NAND flash memory chips simultaneously. This parallelism significantly improves the overall speed and throughput of the SSD, making it faster and more efficient in handling data-intensive tasks.

Meanwhile, the cache 106 in an SSD functions as a high-speed, temporary storage area that stores frequently accessed data to expedite read and write operations. The cache can be of two types: a read cache and a write cache. A read cache stores frequently accessed data that the computer or application requests. When a read request is made, the SSD first checks the cache. If the data is present there, it can be retrieved much faster than reading it directly from the NAND flash memory, as accessing data from the cache is significantly quicker. This read caching mechanism results in reduced latency and improved read speeds, benefiting tasks such as loading applications, booting the operating system, and opening frequently used files. A write cache, on the other hand, stores data temporarily before it's permanently written to the NAND flash memory. When the computer writes data to the SSD, it's initially stored in the write cache. This enables the SSD to quickly acknowledge write requests to the operating system, improving write performance. Later, during idle periods or when the write cache is full, the data is moved from the cache to the NAND flash memory. This mechanism enhances write performance for tasks like file transfers, application installations, and real-time data recording.

FIGS. 1B and 1C illustrate two power modes associated with a respective fingerprint or input, with a specific fingerprint or input associated with each mode. For example, a different fingerprint can be associated with each power mode. In the illustrated figures, the external data storage device 100 associates a first input 108, such as a first fingerprint, with a reduced power mode and a second input 110, such as a second fingerprint, with a standard or normal power mode. Fingerprints may be obtained from a little, ring, middle, ring, index, or thumb of the user. As discussed above, templates can be stored on the external data storage device 100 for each fingerprint, with a specific fingerprint template associated with a specified storage mode.

In FIG. 1B, the external data storage device 100 receives a first input 108, such as first fingerprint on the fingerprint scanner 102 or a selection from an application running on a different device. For example, the external data storage device can determine that the first fingerprint matches a stored template of the first fingerprint and activates the associated power mode, which in this case is the reduced power mode.

In the reduced power mode, the amount of memory channels 104 and cache 106 used by the external data storage device 100 can be reduced to lower power consumption. That is, there may be an inactive portion 105 of the memory channels and an inactive portion 107 of the cache that remain unused to conserver power. For example, the number of memory channels used at the same time can be changed in order to lower power usage. By using less parallelization, at least some power can be saved. This may lead to lower performance, but reduce power consumption. For example, the amount of memory channels 104 used for by the SSD can be reduced by a percentage, such as 30%, 40%, 50%, 60% or the like, until additional power is used.

In another example, the amount of cache used by the SSD or other type of storage device can be reduced based on the power available to the storage device. This may lead to lower performance, but reduce power consumption. For example, the amount of cache used for by the SSD can be reduced by a percentage, such as 30%, 40%, 50%, 60% or the like, until additional power is used. In some implementations, the entire write cache may be disable until additional power becomes available while the read cache or at least a portion of the read cache remains enabled. As writes occur less often than reads, the performance loss can be less noticeable than if read cache were disabled or reduced.

Other hardware resources may also be reduced in order to save power. For example, processor clocks can be lowered to reduce power usage. In addition, certain functionality can be altered or disabled to further reduce power usage. For example, SSD trim command usage can be reduced or disabled. Die interleaving can also be reduced or disabled.

Trim is a feature in SSDs that helps optimize their performance and prolong their lifespan. SSDs work by storing data in memory cells, which are organized into blocks. When you delete a file or perform any write operation on an SSD, the drive doesn't immediately erase the data in the corresponding memory cells. Instead, it marks those cells as invalid and ready for garbage collection. Over time, as more data is written to the drive, these invalid cells accumulate, leading to performance degradation.

Trim is a command that the operating system sends to the SSD, instructing it to proactively erase the marked invalid data blocks, effectively freeing up space for new data. This process helps maintain consistent performance levels and prevents the drive from becoming cluttered with invalid data. As trim is not immediately necessary, it can be delayed during the reduced power mode. However, delaying trim can lead to SSD slow down, as the SSD would need to erase and rewrite data before writing new information, which is a slower process than writing to clean memory cells.

Meanwhile, die interleaving is a technique used in SSDs to enhance their performance and efficiency. In an SSD, NAND flash memory chips are typically organized into multiple dies, with each die consisting of a certain number of memory cells. Die interleaving takes advantage of these multiple dies to parallelize data read and write operations for greater efficiency. When a data request is received, die interleaving enables the SSD controller to simultaneously access multiple dies to retrieve or write data. This parallelism significantly boosts the overall data throughput and reduces latency. By reducing die interleaving during a reduced power mode, less hardware resources are used, but at the cost of lower performance.

In FIG. 1C, the external data storage device 100 receives a second input 110, such as a second fingerprint on the fingerprint scanner 102. For example, the external data storage device 100 can determine that the second fingerprint matches a stored template of the second fingerprint and activates the associated storage mode, which in this case is a normal or standard power mode.

In one implementation, the standard power mode causes the external data storage device 100 to fully utilize available resources or otherwise remove limitations on the usage of resources such as on the memory channels 104 and/or cache 106. The external data storage device 100 may go back to utilizing the initial power amount negotiated with the host device. As a result, power consumption and performance both increase.

Figure 2:
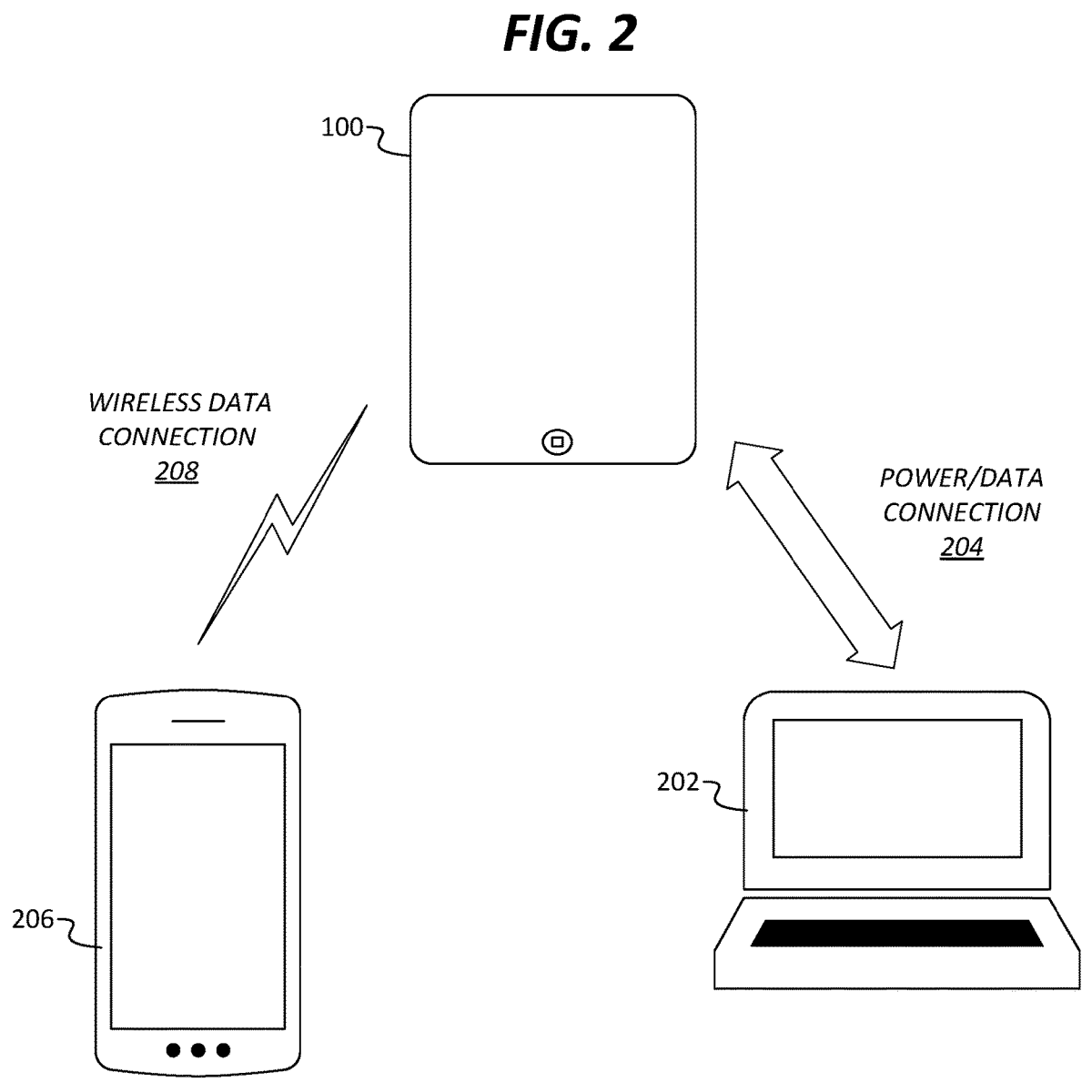

FIG. 2 illustrates a separate input device 206 for the external data storage device 100, according to certain embodiments. In some embodiments, the input device 206 is a mobile device that connects, through a wireless data connection 208 with the external data storage device 100. The external data storage device is configured to connect, via a power/data connection 204 with a host device 202. The external data storage device can communicate with and receive power from the host device. Additionally, the external data storage device 100 may also receive instructions, commands, configuration settings, or other data from the mobile device. In the illustrated embodiment, the input device 206 is separate from both the external data storage device 100 and the host device 202.

In one example scenario, the user uses the input device 206 to run an application or mobile "app" that can communicate with and control the external data storage device 100. The application can enable the user to configure the settings of the external data storage device 100, select the current power mode, and/or otherwise modify the functionality of the external data storage device 100.

Various types of technologies can be used to provide the wireless data connection 208. Some of the most notable types of wireless technology include Wi-Fi, which enables devices to connect to the internet or local networks through wireless routers; Bluetooth, facilitating short-range connections between devices like headphones and smartphones; and cellular communication, which includes 3G, 4G, and 5G networks providing mobile internet access and voice services. Other technologies include Near Field Communication (NFC), which permits close-range data transfer and is used for contactless payments. Radio-Frequency Identification (RFID) uses radio waves for object and individual identification, and Zigbee and Z-Wave are protocols for smart home devices. Infrared (IR) is employed in remote controls. Long Range Wide Area Network (LoRaWAN) enables long-range, low-power Internet of things (IoT) applications.

Various types of technologies can be used to provide the power/data connection 204. One of the most common technologies for providing a power/data connection is USB, which is used for connecting various peripheral devices to computers, laptops, and other electronic devices. It was developed to simplify the process of connecting and discon-
necting devices by providing a common, standardized con-
nector and protocol. USB ports and cables come in various
shapes and sizes. USB supports data transfer, power deliv-
ery, and device charging. Its versatility enables it to connect
a wide range of devices, including external hard drives,
keyboards, mice, printers, smartphones, cameras, and more.
Alternatives technologies to USB include: Thunderbolt,
which is a high-speed interface that offers fast data transfer
rates and supports peripherals like external hard drives and
monitors; FireWire (IEEE 1394), which is a high-speed
interface commonly used for connecting devices like cam-
corders and audio interfaces; and eSATA (External SATA),
which is typically used for connecting external hard drives.

Figure 3A:
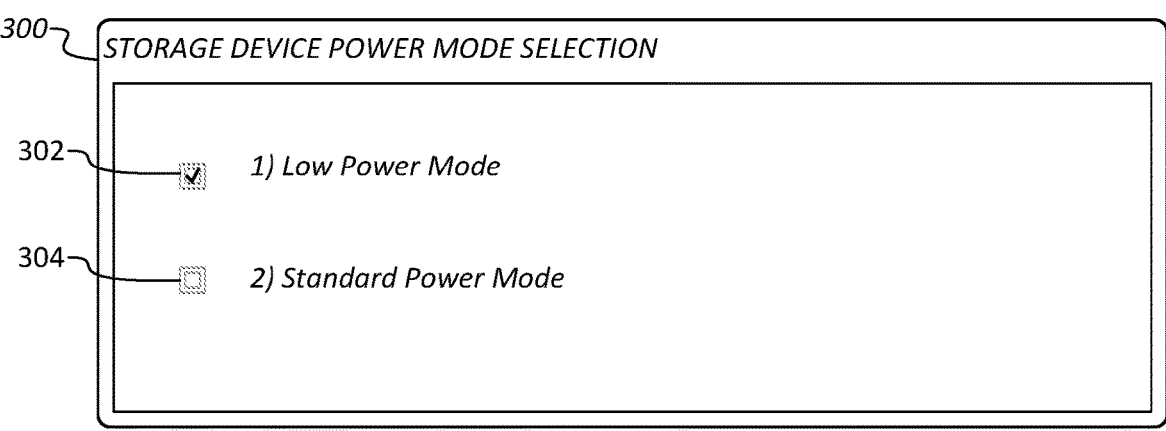
FIGS. 3A and 3B illustrate user interface screens for choosing and configuring a power mode for an external data storage device, according to certain embodiments.
Figure 3B:
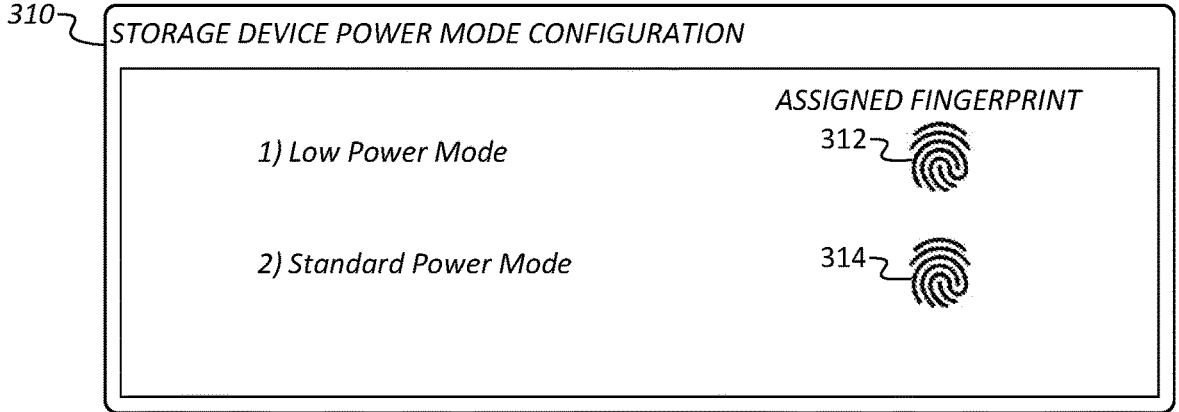

FIGS. 3A and 3B illustrate user interface screens 300, 310
for choosing and configuring a power mode for an external
data storage device 100, according to certain embodiments.
These user interface screens may be part of an application
running on an input device 206, such as a mobile device that
includes a display and an input mechanism (e.g. touch-
screen).

In FIG. 3A, the user interface screen 300 provides options
for a user to select power modes for the external data storage
device 100. In one implementation, the user is provided a
selection between two modes, a low power mode 302
(sometimes called a reduced power mode) and a standard
power mode 304. In the low power mode 302, the external
data storage device 100 reduces performance by turning off
software functionality and/or reducing usage of hardware
resources. In the standard power mode 304, the external data
storage device 100 operates with access to its full function-
ality. It may not necessarily use the full power allocated to
it by a host device (e.g., it may be idling or only have a
limited workload), but is capable of responding to read/write
requests using all its available resources.

In FIG. 3B, the user interface screen 300 provides options
for a user to configure the external data storage device 100.
Such options can include associating a first fingerprint 312
with a first power mode (e.g., low power mode) and asso-
ciating a second fingerprint 314 with a second power mode
(e.g., standard power mode). In embodiments where more
than two power modes are implemented, a third, fourth, etc.
fingerprint can be associated with those power modes. Other
options for configuring the external data storage device 100
can include selecting which power reduction options to take
(e.g., reduce cache, reduce channels, reduce TRIM, etc.)
and/or providing an order or priority for the power reduction
options. For example, if the power deficit from the host
device 202 is small, the external data storage device 100
may only need to implement one power reduction option.
That option can be selected by the external data storage
device 100 based on the priority or order set by the user.

FIG. 4 illustrates a block diagram representing a power
reduction process 400 performed by an external data storage
device 100, according to certain embodiments. The external
data storage device 100 may be connected with a host
system. For example, the external data storage device 100
may be an external drive in a separate enclosure from the
host system and connected to a data interface of the host
system by a cable. For ease of reference, the following
discusses the power reduction process 400 in reference to
the external data storage device 100 of FIGS. 1A-1C and
FIG. 2, though it can be adapted to work with different types
of storage devices. Furthermore, the process may be per-
formed by the external data storage device 100, or one of its
components, such as its control circuitry or controller.

At block 402, the external data storage device 100 ini-
tializes a connection with a host device 202. Prior to this, the
external data storage device 100 may be connected by the
user to a data interface of the host system. The data interface
may be a USB port on the host system, connected by a USB
cable to another USB port on the external data storage
device 100. Other types of data interfaces can also be used,
such as Lightning, Thunderbolt, external serial ATA
(eSATA), or the like.

Initializing the connection may involve a handshake or
other negotiation process. For example, USB devices utilize
USB enumeration to establish a connection. USB enumera-
tion is a process that takes place when a USB device is
connected to a computer or other host system. Upon con-
nection, the USB controller on the host system detects the
device and establishes its power requirements. The control-
ler then communicates with the device to determine its
supported USB speed, such as USB 2.0 or USB 3.0. Next,
the USB device provides its Vendor ID (VID) and Product
ID (PID) to the host, which helps the operating system (OS)
identify the device and locate the appropriate device drivers.

The OS then checks its driver database or other data
structure and either prompts the user for driver installation
or automatically installs the necessary driver for the device.
Such a driver may be configured to enable the power
reduction process 400 to be supported by the host system,
such as by providing notification of a low-battery status at
the host or other indicating that the power from the host
device will be reduced. Once the driver is loaded, the host
OS configures the USB device by assigning resources and
determining its capabilities. Endpoint allocation can then
take place, where the host OS assigns logical channels
(endpoints) for data transfer based on the device's defined
interfaces. The OS notifies relevant applications or services
about the connected device, enabling them to interact with
the device using the appropriate Application Programming
Interface (API).

At block 404, the external data storage device 100 nego-
tiates delivery of a first amount of power from the host
device 202 in response to connecting the external data
storage device 100 to the host device. When a USB device
is plugged into a host computer or hub, it goes through a
sequence of steps to determine the amount of power it can
draw from the host device 202. This negotiation primarily
occurs during the enumeration phase.

During enumeration, the USB device communicates with
the host using control transfers to exchange information
about its power requirements. The device provides its maxi-
mum power consumption in the form of descriptors, and the
host evaluates whether it can supply the required power
without exceeding its own power limits. This evaluation is
based on the USB specification, which defines various
power classes and levels (e.g., Low Power, High Power,
SuperSpeed). The host device may also take into account the
available power budget, which depends on factors such as
the host's USB version (USB 2.0, USB 3.0, USB 3.1, etc.)
and the number of connected devices.

Once the host and device agree on the power require-
ments, the host device 202 allocates a specific amount of
power to the device, typically by configuring its USB port
accordingly. This ensures that the USB device receives an
adequate and safe power supply to operate correctly. If a
device exceeds its allocated power, it can lead to malfunc-
tions or even damage to the device or the host. Conversely,
if a device requests less power than it actually needs, it may
not function correctly.

With the enumeration process complete, the USB device and the host device are ready to exchange data through the allocated endpoints, utilizing the suitable USB protocols. USB enumeration ensures proper device identification, driver installation, and configuration, enabling effective communication and functionality between the USB device and the computer.

Optionally, at block 406, the external data storage device 100 determines that the current power being received from the host device 202 is less than the negotiated first amount of power. For example, USB devices can include integrated voltage monitoring circuits that are typically part of the USB interface controller or power management circuitry within the USB device. These circuits can include a voltage divider circuit, consisting of resistors, to measure the voltage on the USB bus. In one scenario, the external data storage device 100 can measure the voltage being received from the host device and compare it to a value stored in memory corresponding to the first power amount. If the current voltage drops below the stored value, or drops below the stored value for a specified amount of time, the external data storage device 100 can determine that the host device 202 is incapable of providing the negotiated, first amount of power.

Optionally, at block 408, the external data storage device 100 indicates or signals to the user that the received power is less than the negotiated first amount of power. Such an indication or signal may be provided via a notification on an app running on an input device 206 or via an indicator, such as light emitting diodes (LEDs) on the casing of the external data storage device. By providing the indication to the user, the user can be provided the opportunity to select a reduced power mode for the external data storage device 100.

At block 410, the external data storage device 100 receives a selection of a reduced power mode from the user. The user may enter the selection from an input device. The input device may be something built into a casing of the external data storage device 100, such as a fingerprint sensor or button. Alternatively, the input device may be third device separate from the external data storage device 100 and the host device 202, such as a mobile device or smart phone. The selection of the reduced power mode may be accomplished via a user interface of an application (e.g., through a selection button or the like), mechanical actuation (e.g., physical button), or sensor detection (e.g. fingerprint sensor). For example, the user may use a finger having a fingerprint that is associated with the reduced power mode to touch the fingerprint sensor. The external data storage device 100 can then detect that fingerprint to determine that the user has made the selection of the reduced power mode.

At block 412, the external data storage device 100, in response to the selection of the reduced power mode, reduces power consumption from the host device to a second amount of power that is lower than the first amount of power. This second amount of power may be a specified amount associated with the reduced power mode or a selection based on a list of potential reduced power levels. For example, if the power shortfall is only a small amount, the power reduction amount selected may be a first, small amount. This small amount may be associated with a small reduction in performance. If the power shortfall is a larger amount, the power reduction selected may be a second, larger amount. This larger amount may be associated with a larger reduction in performance, implemented by disabling a greater amount of hardware resources or a larger amount of software functionality than the first, small amount.

As discussed above, various types of techniques can be used to reduce power consumption. For example, less hardware resources such as cache or channels can be used. Software operations, such as TRIM, may be reduced or delayed. Typically, these techniques to reduce power result in lower performance.

Optionally, at block 414, the external data storage device 100 can indicate to the user that the power being received from the host device is equal to or greater than the second amount of power. Such an indication may be provided via a notification on the application on the input device 206 or via an indicator, such as the LEDs on the casing of the external data storage device. By providing the indication to the user, the user can be reassured that the user can keep using the external data storage device 100 with no or little risk of a malfunction in its operation, albeit with a lower performance level. The process can then end. Alternatively, the process may further enable the user to go back the standard power mode.

At some point the host device may receive additional power. For example, the host device may be plugged into a wall outlet and become capable of providing the original, negotiated amount of power. Optionally, the external data storage device may signal to the user that the additional power is available. The user can then select, on the input device, a standard power mode associated with the original, negotiated amount of power. The external data storage device 100 can then reset the power consumption back to the original, negotiated amount of power, thereby raising the performance of the external data storage device 100. The process can then end.

Figure 5:
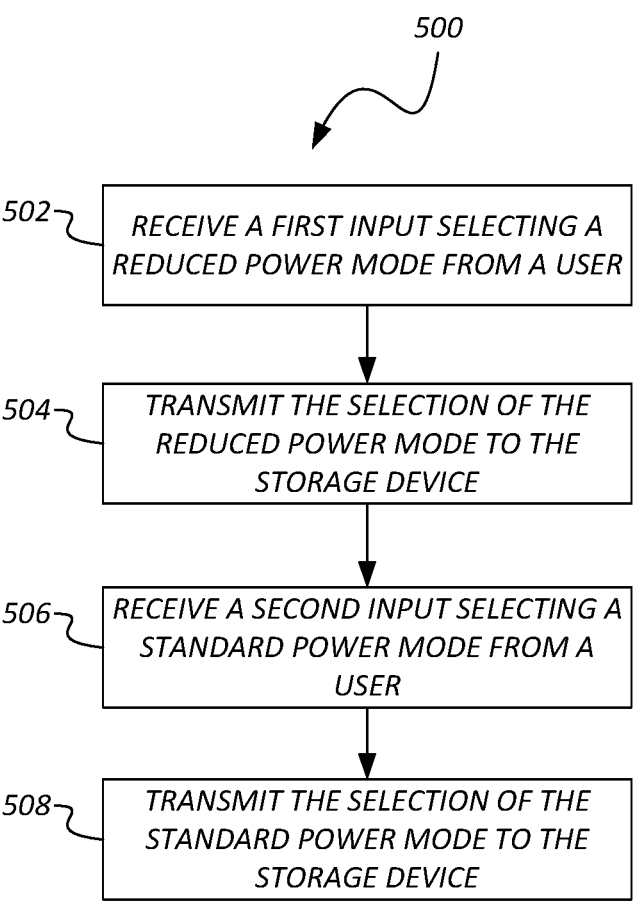
FIG. 5 illustrates a block diagram representing a selection process for a reduced power mode performed by an input device, according to certain embodiments.

FIG. 5 illustrates a block diagram representing a selection process 500 for a reduced power mode performed by an input device, according to certain embodiments. In some implementations, the external data storage device 100 can include the input device, such as a fingerprint scanner for receiving fingerprints or other type of input mechanism. In other implementations, the input device is a separate device from the host device and the external data storage device 100, such as an application running on a mobile device or smart phone. For ease of reference, the following discusses the selection process 500 in reference to the external data storage device 100 of FIGS. 1A-1C and FIG. 2, though it can be adapted to work with different types of storage devices. Furthermore, the process may be performed by the external data storage device 100 (or one of its components, such as a fingerprint scanner) or by a separate input device.

At block 502, the input device receives a first input selecting a reduced power mode from a user. The input may be received on a fingerprint scanner or other input mechanism on a casing of the external data storage device 100 or may be received on a touchscreen or other input mechanism of a separate input device. For example, user may touch a first finger with a first fingerprint to the fingerprint scanner, where the first fingerprint is associated with the reduced power mode. The selection may be made using a physical input (e.g., scanner, button, etc.) or a software input (e.g., application software interface).

At block 504, the input device transmits the selection of the reduced power mode to the storage device. If the input device is separate from the external data storage device 100, transmission may be made via a wireless connection, such as Wi-Fi, Bluetooth, or the like. The external data storage device 100 may include a wireless interface (e.g., chip, antenna, etc.) for receiving such wireless signals. If the input device is part of the external data storage device 100, transmission may be via a wire, trace or other physical connection. After receiving the selection, the external data storage device 100 can enter the reduced power mode.

At block 506, the input device receives a second input selecting a standard power mode from the user. The second input may be received on a fingerprint scanner or other input mechanism on a casing of the external data storage device 100 or may be received on a touchscreen or other input mechanism of a separate input device. For example, user may touch a second finger with a second fingerprint to the fingerprint scanner, where the second fingerprint is associated with the standard power mode.

At block 508, the input device transmits the selection of the standard power mode to the storage device. The transmission can be made by wireless connection or by physical connection. The process can then end.

Example Storage Device and Host System

FIG. 6 illustrates example details of the external data storage device 100 and a host system 600, according to certain embodiments. As illustrated, the host system 600 can include one or more of the following components, devices, modules, and/or units (referred to herein as "components"), either separately/individually and/or in combination/collectively: central processing unit (CPU) 602 or other type of processor, memory 604, communication interfaces 606, a power source 608 (e.g., battery or power supply unit), and/or one or more I/O components 610, such as a display 614 and/or input/output (I/O) devices 616.

In some embodiments, the host system 600 can comprise a housing/enclosure configured and/or dimensioned to house or contain at least part of one or more of the components of the host system 600. For example, the host system 600 may be a server or desktop system in a case or rack mount enclosure.

The memory 604 can employ a variety of storage technologies and/or form factors and can include various types of volatile memory, such as Random Access Memory (RAM). RAM is a type of computer memory that serves as a temporary storage area for data and instructions that are actively being used by a computer's operating system, applications, and processes. RAM is volatile memory, meaning that its contents are lost when the computer is powered off or restarted. RAM provides fast and temporary access to data, enabling the CPU 602 to quickly retrieve and manipulate the information it needs to perform tasks. The memory 604 can include programs or other software that are running on the host system 600, such as various USB drivers. In addition, the host system 600 may also include non-volatile memory for permanently storing data.

The one or more communication interfaces 606 can be a data interface that includes connectors, cables, and/or protocols for connection, communication, and/or supplying power between host devices and the external data storage device 100. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the external data storage device 100, such as male or female Type A, Type B, Type C, mini, and/or micro connectors. Other data interface standards can also be used, such as external SATA (eSATA), ExpressCard, FireWire, and Thunderbolt. The data interface can include a port for connecting with a cable and/or a corresponding port on the external data storage device 100, forming a data connection 620 with the external data storage device 100.

The power source 608 can be configured to provide/manage power for the host system 600. The power source

608 can comprise one or more devices and/or circuitry configured to provide a source of power and/or provide power management functionality. Moreover, in some embodiments the power source 608 includes a mains power connector that is configured to couple to an alternating current (AC) or direct current (DC) mains power source. In some embodiments, the power source can include one or more batteries, such as a lithium-based battery, a lead-acid battery, an alkaline battery, and/or another type of battery. The power source can also be configured to provide power to external data storage devices 100 via a power interface such as USB or the like.

The one or more I/O components 610 can include a variety of components to receive input and/or provide output. The one or more I/O components 610 can be configured to receive touch, speech, gesture, biometric data, or any other type of input. In examples, the one or more I/O components 610 can be used to provide input regarding control of the host system 600, such as opening files, entering logins, plays, and/or changing settings. As shown, the one or more I/O components 610 can include the one or more displays 614 configured to display data and various user interfaces. The display 614 can include one or more liquid-crystal displays (LCD), LED displays, organic LED displays, plasma displays, electronic paper displays, and/or any other type(s) of technology. In some embodiments, the display 614 can include one or more touchscreens configured to receive input and/or display data. Further, the one or more I/O components 610 can include the one or more input/output devices 616, which can include a touchscreen, touch pad, controller, mouse, keyboard, wearable device (e.g., optical head-mounted display), virtual or augmented reality device (e.g., head-mounted display), etc.

As illustrated, the external data storage device 100 can include one or more of the following components, devices, modules, and/or units (referred to herein as "components"), either separately/individually and/or in combination/collectively: control circuitry 650, memory 652, storage media 654, communication interfaces 656, optionally a fingerprint sensor 660 or other input mechanism, and/or optionally one or more LEDs 664. In some embodiments, the external data storage device 100 can comprise a housing/enclosure configured and/or dimensioned to house or contain the components of the external data storage device 100.

The external data storage device 100 may be an SSD, Secure Digital (SD) card, or a universal serial bus memory stick that uses semiconductor memory as the storage media. In other implementations, the data storage may be an HDD that uses magnetic disks as the storage media or an SSHD that uses a combination of semiconductor memory and magnetic disk technology.

Although certain components of the external data storage device 100 and host system 600 are illustrated in FIG. 6, it should be understood that additional components not shown can be included in embodiments in accordance with the present disclosure. Furthermore, certain of the illustrated components can be omitted in some embodiments. Although the control circuitry 650 is illustrated as a separate component, it should be understood that any or all of the remaining components of the external data storage device 100 can be embodied at least in part in the control circuitry 650. That is, the control circuitry 650 can include various devices (active and/or passive), semiconductor materials and/or areas, layers, regions, and/or portions thereof, conductors, leads, vias, connections, and/or the like, wherein one or more of the other components of the external data storage device 100 and/or portion(s) thereof can be formed and/or embodied at least in part in/by such circuitry components/devices.

The various components of the external data storage device 100 can be electrically and/or communicatively coupled using certain connectivity circuitry/devices/features, which can or may not be part of the control circuitry 650. For example, the connectivity feature(s) can include one or more printed circuit boards configured to facilitate mounting and/or interconnectivity of at least some of the various components/circuitry of the external data storage device 100. In some embodiments, two or more of the control circuitry 650, the memory 652, the storage media 654, the communication interface(s) 656, the fingerprint sensor 660, and/or the LEDs 664 can be electrically and/or communicatively coupled to each other.

The storage media 654 can utilize various types of non-volatile memory (NVM) to permanently store data. NVM is a type of computer memory that can retain stored information even after power is removed. For example, the storage media 654 can include one or more magnetic disks and/or semiconductor memory. The semiconductor memory can include any of various memory technologies, such as NAND memory and its variations like single-level cell (SLC), eMLC (Enterprise Multi Level Cell), MLC, TLC, and QLC. New types of emerging non-volatile memory could also be used such as Program in Place or Storage Class Memory (SCM) such as ReRam, Phase-Change Memory (PCM), and Magnetoresistive Random-Access Memory (MRAM).

The one or more communication interfaces 656 can be configured to communicate with one or more device/sensors/systems. For example, the one or more communication interfaces 656 can send/receive data over a network. A network in accordance with embodiments of the present disclosure can include a local area network (LAN), wide area network (WAN) (e.g., the Internet), personal area network (PAN), body area network (BAN), etc.

The one or more communication interfaces 656 can be a data interface that includes connectors, cables, and/or protocols for connection, communication, and/or power supply between the host system 600 and the external data storage device 100. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the external data storage device 100, such as male or female Type A, Type B, Type C, mini, and/or micro connectors. Other data interface standards can also be used, such as external SATA (eSATA), ExpressCard, FireWire, and Thunderbolt. The data interface can include a port for connecting with a cable and/or a corresponding port on the host system 600, forming the data connection 620.

As discussed above, the fingerprint sensor 660 can be used to capture and/or authenticate fingerprints. Based on the fingerprints, the associated storage mode can be selected for the external data storage device 100. In addition, the LEDs 664 can be used to indicate to the user the current storage mode. For example, a first color (e.g., blue) may be used to indicate a first storage mode (e.g., reduced power mode), and a second color (e.g., green) may be used to indicate a second storage mode (e.g., standard power mode). These colors may be manufacturer set default colors or may be set by the user. As the external data storage device 100 typically does not have a display, the LEDs 664 can provide the user with a way to determine the storage mode and to know when the storage mode has been successfully changed.

The term "control circuitry" is used herein according to its broad and ordinary meaning, and can refer to any collection of one or more processors, processing circuitry, processing modules/units, chips, dies (e.g., semiconductor dies including come or more active and/or passive devices and/or connectivity circuitry), microprocessors, micro-controllers, digital signal processors, microcomputers, central processing units, graphics processing units, field programmable gate arrays, programmable logic devices, state machines (e.g., hardware state machines), logic circuitry, analog circuitry, digital circuitry, and/or any device that manipulates signals (analog and/or digital) based on hard coding of the circuitry and/or operational instructions. Control circuitry can further comprise one or more storage devices, which can be embodied in a single memory device, a plurality of memory devices, and/or embedded circuitry of a device. Such data storage can comprise read-only memory, random access memory, volatile memory, non-volatile memory, static memory, dynamic memory, flash memory, cache memory, data storage registers, and/or any device that stores digital information. It should be noted that in embodiments in which control circuitry comprises a hardware state machine (and/or implements a software state machine), analog circuitry, digital circuitry, and/or logic circuitry, external data storage device(s)/register(s) storing any associated operational instructions can be embedded within, or external to, the circuitry comprising the state machine, analog circuitry, digital circuitry, and/or logic circuitry.

The term "memory" is used herein according to its broad and ordinary meaning and can refer to any suitable or desirable type of computer-readable media. For example, computer-readable media can include one or more volatile external data storage devices, non-volatile external data storage devices, removable external data storage devices, and/or nonremovable external data storage devices implemented using any technology, layout, and/or data structure(s)/protocol, including any suitable or desirable computer-readable instructions, data structures, program modules, or other types of data.

Computer-readable media that can be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media.

ADDITIONAL EMBODIMENTS

Those skilled in the art will appreciate that in some embodiments, other types of storage devices can be implemented while remaining within the scope of the present disclosure. In addition, the actual steps taken in the processes discussed herein may differ from those described or shown in the figures. Depending on the embodiment, certain of the steps described above may be removed, others may be added, and the order may be rearranged.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Some or all of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. An external data storage device without a battery, the external data storage device comprising:
   storage media configured to store data;
   a data port configured to receive power from and transmit data to a host device, wherein the external data storage device is separate from the host device; and
   control circuitry configured to:
      negotiate delivery of a first amount of power from the host device in response to connecting the external data storage device to the host device via the data port;
      receive the first amount of power from the host device via the data port;
      receive a selection, via an input device separate from the host device, of a reduced power mode from a user, wherein the input device is a part of the external data storage device or is a mobile device configured to communicate wirelessly with the external data storage device, wherein the selection is received directly from the input device without passing through the host device, wherein the reduced power mode is configured to reduce the first amount of power from the host device via the data port; and
      reduce power consumption from the host device via the data port to a second amount of power lower than the first amount of power in response to receiving the selection of the reduced power mode.

2. The external data storage device of claim 1, wherein the control circuitry is further configured to detect that the host device is providing less than the first amount of power to the external data storage device.

3. The external data storage device of claim 1, wherein the input device comprises a mobile device configured to communicate wirelessly with the external data storage device.

4. The external data storage device of claim 1, further comprising a fingerprint scanner as the input device, with the reduced power mode associated with a first fingerprint.

5. The external data storage device of claim 4, wherein:
   a second fingerprint is associated with a standard power mode; and
   the control circuitry is further configured to, in response to the fingerprint scanner receiving the second fingerprint, cause the external data storage device to set power consumption back to the first amount of power.

6. The external data storage device of claim 1, wherein:
   the external data storage device further comprises memory cache configured to temporarily store data; and
   the control circuitry is further configured to reduce usage of the memory cache in response to receiving the selection of the reduced power mode.

7. The external data storage device of claim 1, wherein:
   the external data storage device further comprises flash memory channels configured to transmit data to the storage media; and
   the control circuitry is further configured to reduce usage of the flash memory channels in response to receiving the selection of the reduced power mode.

8. The external data storage device of claim 1, wherein the control circuitry is further configured to reduce die interleaving usage in response to receiving the selection of the reduced power mode.

9. The external data storage device of claim 1, wherein the control circuitry is further configured to reduce TRIM command usage in response to receiving the selection of the reduced power mode.

10. The external data storage device of claim 1, further comprising an indicator configured to signal to the user that power being received from the host device is below the first amount of power.

11. A method for selectively reducing power usage of an external data storage device, the method comprising:
   negotiating delivery of a first amount of power from a host device in response to connecting an external data storage device without a battery to the host device via a data port of the external data storage device, wherein the external data storage device includes storage media configured to store data, the data port configured to receive power from and transmit data to the host device, and control circuitry, wherein the external data storage device is separate from the host device;
   receiving the first amount of power from the host device via the data port;
   receiving a selection, via an input device separate from the host device, of a reduced power mode from a user, wherein the input device is a part of the external data storage device or is a mobile device configured to communicate wirelessly with the external data storage device, wherein the selection is received directly from the input device without passing through the host device, wherein the reduced power mode is configured to reduce the first amount of power from the host device via the data port; and reducing power consumption from the host device via the data port to a second amount of power lower than the first amount of power in response to receiving the selection of the reduced power mode.

12. The method of claim 11, wherein the input device is a mobile device that is different from both the host device and the external data storage device.

13. The method of claim 11, wherein the input device is a fingerprint sensor that is part of the external data storage device.

14. The method of claim 13, wherein receiving the selection of the reduced power mode comprises detecting a first fingerprint associated with the reduced power mode on the fingerprint sensor.

15. The method of claim 14, further comprising:
   detecting a second fingerprint that is associated with a standard power mode on the fingerprint sensor; and
   resetting the power consumption of the external data storage device back to the first amount of power.

16. The method of claim 11, wherein reducing power consumption from the host device via the data port to the second amount of power comprises reducing usage of memory cache configured to temporarily store data.

17. The method of claim 11, wherein reducing power consumption from the host device via the data port to the second amount of power comprises reducing die interleaving usage.

18. The method of claim 11, wherein reducing power consumption from the host device via the data port to the second amount of power comprises reducing TRIM command usage.

19. The method of claim 11, further comprising signaling to the user, using an indicator, that power being received from the host device is below the first amount of power.

20. An external data storage device without a battery, the external data storage device comprising:
   means for receiving input from a user;
   means for storing data;
   means for receiving power from and transmitting data to a host device; and
   control circuitry configured to:
      negotiate delivery of a first amount of power from the host device in response to connecting the external data storage device to the host device via the means for receiving power from and transmitting data to the host device;
      receive the first amount of power from the host device via the means for receiving power from and transmitting data to the host device;
      receive a selection of a reduced power mode from the user via the means for receiving input from the user, wherein the means for receiving input from the user is separate from the host device, wherein the means for receiving input from the user is a part of the external data storage device, and wherein the selection is received directly from the means for receiving input from the user without passing through the host device, wherein the reduced power mode is configured to reduce the first amount of power from the host device via the means for receiving power from and transmitting data to the host device; and
      reduce power consumption from the host device via the means for receiving power from and transmitting data to the host device to a second amount of power lower than the first amount of power in response to receiving the selection of the reduced power mode.

* * * * *